US012803630B2

(12) United States Patent
McCoy et al.

(10) Patent No.: US 12,803,630 B2
(45) Date of Patent: Nov. 17, 2026

(54) SYSTEMS AND METHODS OF EFFICIENT FRACTIONAL DELAY FILTERING

(71) Applicant: CesiumAstro, Inc., Austin, TX (US)

(72) Inventors: James Wesley McCoy, Leander, TX (US); Thomas Magesacher, Austin, TX (US)

(73) Assignee: CesiumAstro, Inc., Austin, TX (US)

( * ) Notice: Subject to any disclaimer, the term of this patent is extended or adjusted under 35 U.S.C. 154(b) by 401 days.

(21) Appl. No.: 17/870,634

(22) Filed: Jul. 21, 2022

(65) Prior Publication Data

US 2026/0095220 A1 Apr. 2, 2026

(51) Int. Cl.
*H04B 7/06* (2006.01)

(52) U.S. Cl.
CPC .................................. *H04B 7/0617* (2013.01)

(58) Field of Classification Search
None
See application file for complete search history.

(56) References Cited

U.S. PATENT DOCUMENTS

| | | | | |
|---|---|---|---|---|
| 9,906,285 | B2 * | 2/2018 | Ling | H04B 7/0617 |
| 9,923,585 | B2 * | 3/2018 | Laurent-Michel | H04B 1/1027 |
| 10,656,254 | B2 * | 5/2020 | Nestler | A61B 8/5215 |
| 2011/0291891 | A1 * | 12/2011 | Nsenga | H04B 7/0617 342/373 |
| 2019/0081823 | A1 * | 3/2019 | Alic | H04L 25/03006 |
| 2020/0007202 | A1 * | 1/2020 | Khan | H04W 28/0257 |
| 2022/0338839 | A1 * | 10/2022 | He | A61B 8/461 |

* cited by examiner

*Primary Examiner* — Phirin Sam
(74) *Attorney, Agent, or Firm* — Hogan Lovells Cadwalader US LLP

(57) ABSTRACT

A system may include an analog front-end circuit configured to receive signals from an antenna array and a digital circuit coupled to the analog front end. The digital circuit may include a digital beamforming circuit configured to include a Nyquist fractional delay filter that is piecewise continuous in the frequency domain. The Nyquist fractional delay filter may be implemented as a Gaussian Nyquist filter, a generalized raised cosine Nyquist filter, or another Nyquist filter. The fractional delay filter may be critically sampled and evaluated numerically or with a closed-form time-domain expression. The fractional delay filter may be part of a digital beamforming phased array antenna system.

20 Claims, 4 Drawing Sheets

SYSTEMS AND METHODS OF EFFICIENT FRACTIONAL DELAY FILTERING

FIELD

The present disclosure is generally related to digital signal processing, and more particularly, to digital beamforming using a Nyquist fractional delay filter to direct a phased array antenna system.

BACKGROUND

The propagation characteristics of wireless communication waveforms, such as $5^{th}$ Generation (5G) mobile telecommunications waveforms, may require the receiving antenna array to employ beamforming operations using antenna arrays to enable communications. Beamforming refers to a process for computing adjustments to direct a phased-array antenna system to receive and transmit signals.

In general, physical space between antennas of an antenna array may result in minute delays in receiving a signal. Analog beamformers may use phase shifters to account for the delays and to make adjustments to enable beamforming. Digital beamformers may use fractional delay filters to direct the phased-array antenna system to account for the delays and to make adjustments to enable beamforming.

Fractional delay filters are configured to approximate a true time delay across the transmitted bandwidth to maximize gain in a prescribed direction while avoiding undesirable consequences attributable to beam squint. Beam squint is an artifact of analog phase shifting where the array begins to point away from the intended direction at the edges of the transmitted bandwidth.

Delay filters used in beam formation may need to be implemented for every element in the phased array. Accordingly, the number of computations can significantly impact the process time and the power consumption of the system.

SUMMARY

Embodiments of systems, circuits, and methods are described below that may utilize a critically sampled Nyquist filter to provide fractional delay filtering for each element in the phased array. Generally, the Nyquist rate refers to a specific sampling rate/frequency for a given signal, where the signal is sampled at a rate that is twice the bandwidth. To avoid aliasing effects, an analog signal is typically sampled at or above its Nyquist rate. However, the Nyquist filter of the present disclosure is down sampled such that the sampling rate is once per frequency band, rendering the filter critically sampled. The critically sampled Nyquist filter may provide significant improvements in computational efficiency and reduced power consumption as compared to conventional methods and over a wide range of scenarios.

In some implementations, a system may include a Nyquist fractional delay filter that is configured to be piecewise continuous in the frequency domain. The Nyquist fractional delay filter may be implemented as a Generalized Raised Cosine Nyquist, Gaussian Nyquist, or other Nyquist filter that may be critically sampled and that may be evaluated numerically or with a closed-form time-domain expression. In some implementations, the fractional delay filter may be used as part of a digital beamforming circuit of a phased array antenna system.

In some implementations, a system may include a front-end circuit configured to send signals to and receive signals from an antenna array. The system may include a digital beamforming circuit including a critically sampled Nyquist filter configured to provide a plurality of fractional delays to approximate the true time delay across the transmitted bandwidth to enhance gain in a selected direction.

In some implementations, a system may include an analog front-end circuit configured to receive signals from an antenna array and a digital circuit coupled to the analog front end. The digital circuit may include a digital beamforming circuit configured to include a Nyquist fractional delay filter that is piecewise continuous in the frequency domain. The Nyquist fractional delay filter may be implemented as a Gaussian Nyquist filter, a generalized raised cosine Nyquist filter, or another Nyquist filter. The fractional delay filter may be critically sampled and evaluated numerically or with a closed-form time-domain expression. The fractional delay filter may be part of a digital beamforming phased array antenna system.

In other implementations, a system may include an analog front-end circuit configured to receive signals from an antenna array and a digital circuit coupled to the analog front end. The digital circuit including a digital beamforming circuit including a fractional delay filter implemented as a Nyquist filter that is critically sampled.

In still other implementations, a system may include an analog front-end circuit configured to receive signals from an antenna array and a digital circuit coupled to the analog front end. The digital circuit may include a digital beamforming circuit including a fractional delay filter implemented as one of a Gaussian Nyquist filter or a generalized raised cosine Nyquist filter. The fractional delay filter may be critically sampled.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. The figures and detailed description thereto are not intended to limit implementations to the form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

Digital beamforming may require multiple computations, and the number of computations can significantly impact the power consumption of an antenna system. In particular, the true time delay for every element in the antenna array is accounted to perform the digital beamforming operations. To account for the true time delays, fractional delay filters may be employed.

Embodiments of systems, circuits, and methods are described below that may utilize a Nyquist filter to provide fractional delay filtering for beam formation for signal reception and signal transmission. In some implementations, the systems, methods, and circuits may utilize a critically sampled Nyquist filter to provide fractional delay filtering, showing significant improvement in computational efficiency and reduced power consumption over conventional systems.

Figure 1:
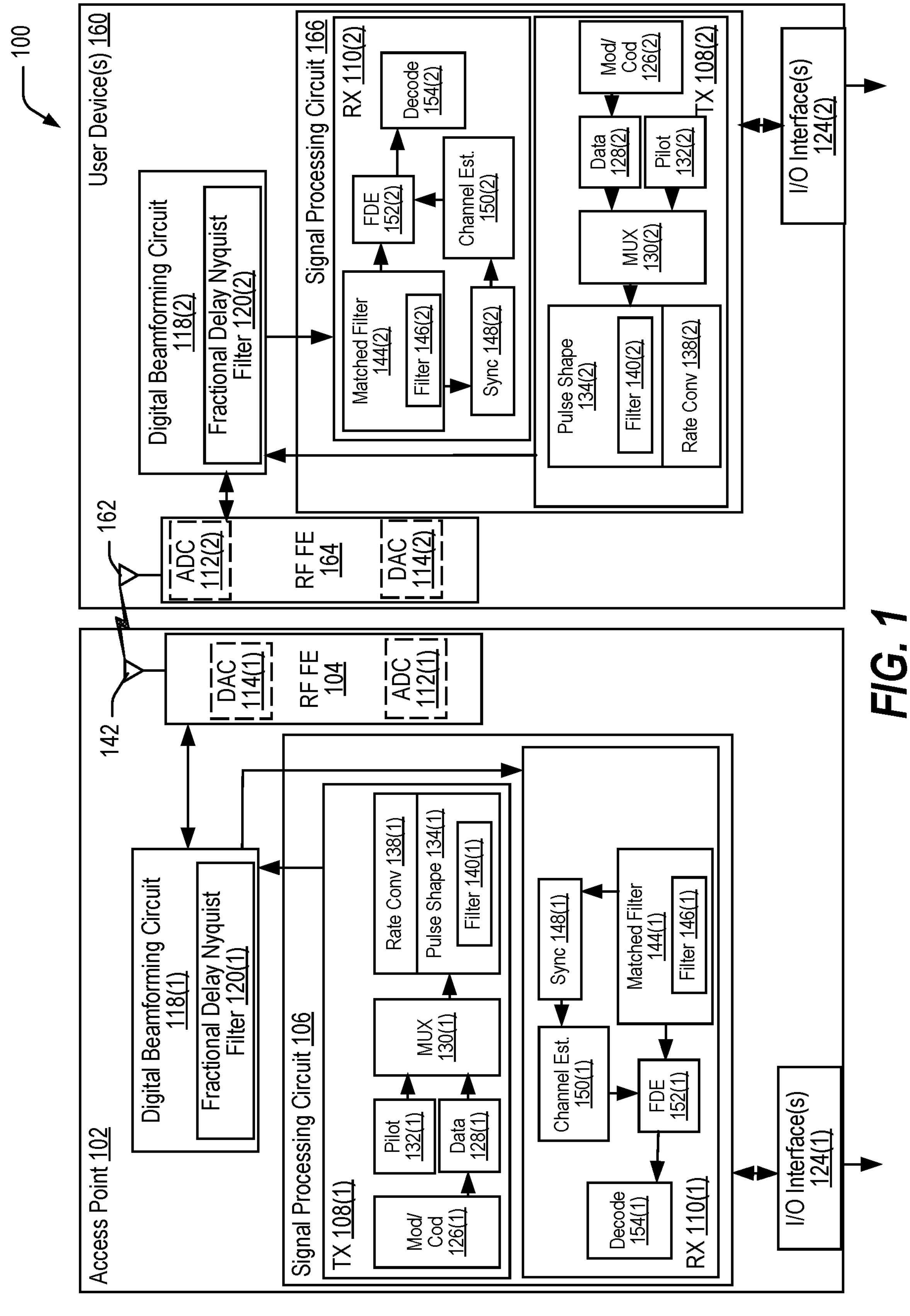
FIG. 1 depicts a block diagram of a wireless communication system including transmit and receive architectures for wireless access points and user devices that may be configured to utilize critically sampled Nyquist fractional delay filters for digital beamforming, in accordance with certain embodiments of the present disclosure.

FIG. 1 depicts a block diagram of a wireless communication system 100 including transmit and receive architectures for wireless access points 102 and user devices 160 that may be configured to utilize critically sampled Nyquist fractional delay filters for digital beamforming, in accordance with certain embodiments of the present disclosure. In the illustrated embodiment, the one or more wireless access points 102 and the one or more user devices 160 may each include signal processing circuitry 106 including field programmable gate array (FPGA) based transmit/receive physical layer signal processing and digital circuitry 116 including a central processing unit (CPU) configured to provide media access control (MAC) based processing to receive decoded signals and to output processed signals through an external interface.

The transmit (TX) path circuitry 108(1) for each of the access point 102 and the one or more user devices 160 includes a modulator/coder (Mod/Cod) 126 that may be configured to modulate data 128, code data 128, or both onto a carrier signal that is combined with a pilot signal 132 by a multiplexer (MUX) 130. The MUX 130 may provide the multiplexed signal output circuitry, such as a pulse shaping circuit 134, a rate converter 138, other circuitry, or any combination thereof to process the multiplexed signal (i.e., carrier plus pilot signal) prior to the signal being sent to receive (RX) path circuitry 110 of the other of the user device 160 or the access point 102 through the antennas 142 and 146. In some implementations, the pulse shaping circuit 134 may include a filter 140, which may be used to provide pulse shaping modulation to the transmit signals.

The transmit path circuitry 108 may provide the shaped signal to a digital beam forming circuit 116, which may include a filter 120. The filter 120 may include a fractional delay Nyquist filter that is piecewise continuous in the frequency domain. The filter 120 may be implemented as Generalized Raised Cosine, Gaussian Nyquist or other Nyquist filter evaluated numerically or with a closed-form time-domain expression that is critically sampled to produce a fractional delay filter that can be used for beamforming as described in greater detail below. The digital beamforming circuit 116 may provide the $N_{Antenna} \times N_{Beams}$ data streams to radio frequency (RF) front end circuitry 104 or 164, which may be coupled to the antennas 142 or 162 and which may provide or may be coupled to digital-to-analog converters (DACs) 114, up-conversion mixers, power amplifiers, and other output circuitry that may facilitate the transmission of the wireless signals through the antennas 142 and 162. The DACs 114 may be part of the RF front end 104 or 164 or may be between the RF front end 104 or 164 and the signal processing circuit 166

The RX path circuitry 110 for the access point 102 and the user devices 160 may receive transmitted wireless signals (i.e., carrier and pilot signals) through the antenna 142 or 162 at the RF front end circuitry 104 or 164. The RF front end circuitry 104 or 164 may provide or may be coupled to analog-to-digital converters (ADCs) 112, down-conversion mixers, power amplifiers, low noise amplifiers, and other circuitry that may facilitate the reception of the wireless signals through the antennas 142 and 162.

In general, the RF front end circuitry 104 of the access point 102 may be similar to the RF front end circuitry 164 of the user device 160 in terms of functionality. In some implementations, the RF front end circuitry 104 may be more complicated to enable reception of multiple multiplexed signals from different user devices substantially simultaneously, while the RF front end circuitry 164 of the user device 160 may be simpler because it does not need to support as many concurrent signals.

The RF front end circuitry 104 or 164 may provide the received signals to an ADC 112 for conversion from the received analog stream to a digital stream, which may be provided to the digital beamforming circuit 118. The fractional delay filter 120 may filter the received digital data streams to extract the fractionally delayed data, which may be provided to the RX receive path 108.

The RX path circuitry 108 for the user device 160 or the access point 102 may receive the transmitted wireless signals (e.g., carrier and pilot signal) through the antenna 162 or 142, respectively. The RF front end 164 or 104 provides the received signal to a matched filter 144, which may include a filter 146 that may be matched to a pulse shaping function of the pulse shaping circuit 134 of the TX path 108. The matched filter 144 may remove the pulse shaping modulation and may output a filtered signal to a frequency domain equalization (FDE) module 152. A synchronization block 148 may also receive the filtered signal and may provide a synchronization signal to a channel estimator 150. The channel estimator 150 may provide the synchronization signal and a received signal strength estimate to the FDE module 152. The output of the FDE module 152 may be provided to the decoder 154, which may decode and demodulate the received signals.

The signal processing circuitry 106 or 166 of the access point 102 or the user device 160 may include or may be coupled to a digital circuit 116 that may include digital beamforming circuitry 118 and that may include an input/output (I/O) interface 124, which may be coupled to other circuits, such as I/O devices or other circuits. Such devices may be internal or external to the access point 102 or the user device 160. In some implementations, the digital circuit 116 may be configured to include one or more features, such as mobile communication services (MCS), beam steering, uplink (UL) control, downlink (DL) control, and other media access control processing features. The I/O interfaces 124 may be configured to couple to external processing circuits, such as host processors. The TX path circuitry 108 and the RX path circuit 110 and the digital circuitry 116 may also communicate information with each other, such as media access control parameters, payload information, physical layer data, decoded data, other data, or any combination thereof.

Figure 2:
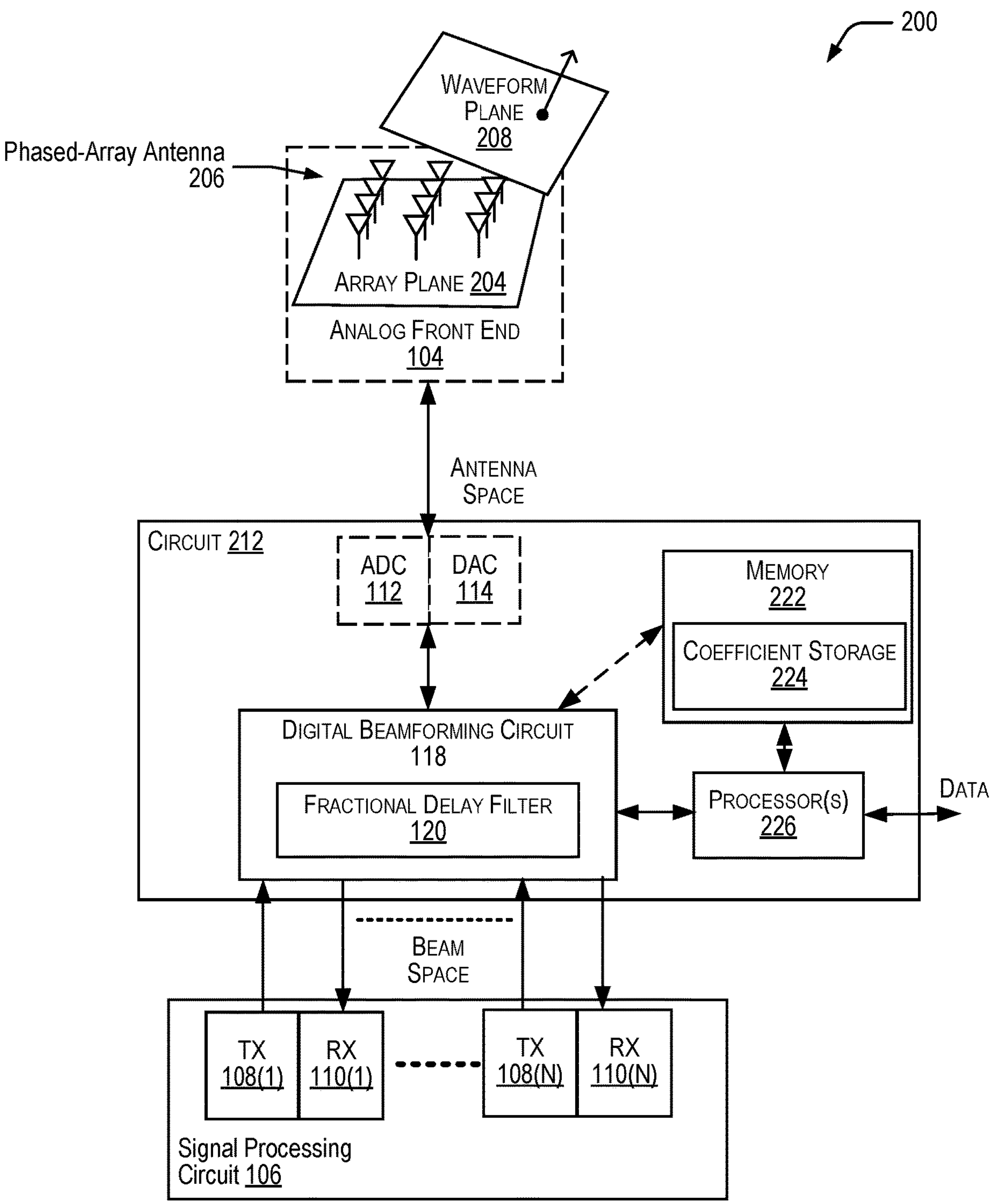
FIG. 2 depicts a block diagram of a system to provide digital beamforming for a phased array antenna using one or more critically sampled Nyquist fractional delay filters, in accordance with certain embodiments of the present disclosure.

FIG. 2 depicts a block diagram of a system 200 to provide digital beamforming for a phased-array antenna 206 using one or more critically sampled Nyquist fractional delay filters, in accordance with certain embodiments of the present disclosure. The system 200 may be a simplified implementation of the access point 102 of FIG. 1.

In the illustrated example, the system 200 may include an analog RF front end 104, which may include an array plane 204 including a phased-array antenna 206 formed from a plurality of antenna element. Each antenna element of the phased-array antenna 206 may be configured to receive and send RF signals. Each antenna element may be coupled to circuitry associated with the analog RF front end 104 and configured to provide signals indicative of a received RF signal. Each antenna element may also receive signals from the circuitry of the analog RF front end 104 and may transmit an RF signal related to the received signals to a receiving device.

The circuitry associated with the analog RF front end 104 may be configured to receive and amplify the signals from the antenna elements and to provide signals for transmission. Additionally, the circuitry within the analog RF front end 104 may be configured to communicate signals to processing circuitry, such as the circuit 212. The circuit 212 may include the signal processing circuitry 106 and the digital circuit 116 of FIG. 1.

The system 200 may include an analog-to-digital converter (ADC) 112 and digital-to-analog converter (DAC) 114, which may be coupled to the analog RF front end 104. In some implementations, the ADC 112, the DAC 114, other circuitry, or any combination thereof may be integrated within the circuit 212 or and may be positioned between the analog RF front end 104 and the circuit 212. The ADC 112 may convert analog signals from the analog RF front end 104 into digital data that may be processed by the circuit 212, including the digital beamforming circuit 118. Additionally, the DAC 114 may convert digital data from the circuit 212, such as the digital beam-forming circuit 118, into analog signals that may be provided to the analog RF front end 104 for transmission via the phased-array antenna 206.

It should be appreciated that the implementation depicted in FIG. 2 represents a simplified version of the access point 102 in FIG. 1. However, the concept of the digital beamforming circuit 118 with the fractional delay Nyquist filter 120 may implemented in a user device 160, an access point 102, or other communication system.

The digital beamforming circuit 118 may be coupled directly to a memory 222, which may store filter coefficients in a coefficient storage 224. Alternatively, the digital beamforming circuit 118 may be coupled to the memory 222 indirectly through a processor 226. In some implementations, the processor 226 may determine the filter coefficients dynamically (on the fly). In some implementations, the processor 226 may receive data from a data source, such as another processor, a input device, or other source, and may provide the data to the digital beamforming circuit 118 for transmission.

The digital beamforming circuit 118 may provide data to or receive data from the signal processing circuit 106. The signal processing circuit 106 may include a transmit path circuit 108 and a receive path circuit 110 corresponding to each element of the antenna array. The digital beamforming circuit 118 may determine $N_{Antenna}$ by $N_{Beam}$ data streams, each of which may be provided to one of the receive path circuits 110. When sending data via the antenna array 206, the process may be reversed.

The digital beamforming circuit 118 may include the fractional delay filter 120, which may be configured to determined fractional delay data for beamforming. The fractional delay filter 120 may be implemented in a variety of different ways. In some implementations, the fractional delay filter 120 may be implemented based on a critically sampled Nyquist filter, as described below.

Nyquist filters may be used in efficient communications systems for matched filtering without incurring inter-symbol interference. The most common form of Nyquist filter or square root Nyquist filter is the raised cosine or square root raised cosine filter. The expressions for these waveforms have closed-form expressions for the time-domain waveform, which may work well for fractional delay filters. However, especially in the case of the square root raised cosine filter, the filter may have a poor time response due to discontinuities in the first derivative of the frequency response.

While raised cosine filters are improved over the square root raised cosine filter, it is possible to do better. A generalization of the raised cosine filter is presented in equation 1 below with countable continuous derivatives in the frequency domain.

$$H_n(f) = T;\ \text{for } |f| \le \frac{1-\beta}{2T} \tag{1}$$

In equation 1, the frequency response of the filter H is a function of the symbol period T. This relationship holds true provided that the absolute value of the frequency f is less than or equal to one minus the roll-off frequency β divided by two times the symbol period T.

The frequency response of equation 1 may be rewritten as a generalization of the raised cosine filter as shown in equations 2 and 3 below.

$$\begin{aligned} H_n(f) = & \\ & \frac{T}{2}\Big\{A_0 + A_1\cos\Big(\frac{\pi T}{\beta}\Big[|f| - \frac{1-\beta}{2T}\Big]\Big) + A_3\cos\Big(3\frac{\pi T}{\beta}\Big[|f| - \frac{1-\beta}{2T}\Big]\Big) + \\ & \ldots + A_{2n+1}\cos\Big((2n+1)\frac{\pi T}{\beta}\Big[|f| - \frac{1-\beta}{2T}\Big]\Big)\Big\}; \\ & \text{for } \frac{1-\beta}{2T} < |f| \le \frac{1+\beta}{2T} \end{aligned} \tag{2}$$

$$H_n(f) = 0;\ \text{for } |f| > \frac{1+\beta}{2T} \tag{3}$$

In equation 2, the generalization of the raised cosine filter that has a calculated frequency response value for frequencies that fall within a band that is within a range of $$\frac{1-\beta}{2T} < |f| \le \frac{1+\beta}{2T}.$$

In equation 3, when the absolute value of the frequency is greater than $$\frac{1+\beta}{2T},$$

the frequency response is zero.

It should be understood that the frequency behavior $H_n(f)$ is even-symmetric around f=0 and odd-symmetric in the vicinity of the frequency being equal to plus or minus one divided by two times the roll-off frequency. Additionally, smoothness in the frequency space translates into better decay behavior in time by applying the inverse Fourier transform. In some implementations, the raised-cosine Nyquist equation may be generalized by factorizations of the frequency functions.

Furthermore, the generalization of the raised cosine filter of equation 2 has a closed-form expression for the time-domain response as shown in the following equation 4, which is the inverse Fourier transform of equation 1.

$$h_n(t)=\frac{\sin(\pi t(1-\beta))}{\pi t}+\frac{\cos(\pi t)\sin(\pi\beta t)}{\pi t}+\sum\nolimits_{k=0}^{k=n}A_{2k+1}\frac{4\beta^2 t\sin(\pi t)\cos(\pi\beta t)}{(2k+1)^2\pi-4\pi\beta^2t^2} \tag{4}$$

The time-domain filter may be rewritten into matrix form as shown in equation 5 below, where the matrix determines the higher order number of continuous derivatives.

$$\begin{bmatrix}1 & 1 & \cdots & 1\\ 1^2 & 3^2 & \vdots & (2n+1)^2\\ \vdots & \vdots & \vdots & \vdots\\ 1^{2n} & 3^{2n} & \cdots & (2n+1)^{2n}\end{bmatrix}\begin{bmatrix}A_1\\ A_3\\ \vdots\\ A_{2n+1}\end{bmatrix}=\begin{bmatrix}1\\ 0\\ \vdots\\ 0\end{bmatrix} \quad [5]$$

The above time-domain equations are valid except at points where the denominator terms are greater than zero, in which case the continuation of the function may be applied at that point. The matrix in equation 5 is a square matrix and both the determinant and the inverse have closed form solutions, which means that the solution vector also has a closed-form solution. The closed-form solutions are piece-wise continuous in the frequency domain. The matrix may be used to determine higher order numbers of continuous derivatives. Additionally, it is possible to linearly combine such filters and retain the Nyquist properties according to equation 6 below.

$$h(t)=\sum\nolimits_{k=0}^{n}a_k h_k(t);\ \text{subject to}\ \sum a_k=1 \tag{6}$$

The Nyquist filter can be down-sampled such that the down-sampling factor is equal to the number of filters (i.e., the number of antennas within the phased-array antenna 206) so that the fractional delay filter 120 is critically sampled (once per sample period).

In general, radio frequency signals are received asynchronously, so it is assumed that the communications links are not synchronized. Accordingly, the filter equations may be written to include a prescribed time error as shown in equations 7 and 8 below.

$$h_n(t+\tau)\ \text{where}\ t=i\in Z, \tag{7}$$

where the time t is an integer value i within the sample space Z. The variable t represents the prescribed time error or fractional offset. In equation 8 below, the closed-form expression for the time-domain response of the generalization of the raised cosine filter in equation 4 is rewritten to include the prescribed time error.

$$h_n(i+\tau)=\frac{\sin(\pi(i+\tau)(1-\beta))}{\pi i}+\frac{\cos(\pi(i+\tau))\sin(\pi\beta(i+\tau))}{\pi i}+\sum\nolimits_{k=0}^{k=n}A_{2k+1}\frac{4\beta^2 t\sin(\pi(i+\tau))\cos(\pi\beta(i+\tau))}{(2k+1)^2\pi-4\pi\beta^2(i+\tau)^2} \tag{8}$$

In equation 8, the variable i represents an integer value within a sample space Z, τ represents a fractional delay, β represents a roll-off factor, and $A_n$ represents coefficients, and k represents an index value, one for each antenna element of the array 206. Thus, it is possible to provide a closed-form expression of a fractional delay filter with a parameterized design space in not only β and also in $a_k$. In this example, the delays may be accounted for using the prescribed time error, which may account for the fractional delays.

The time-domain closed-form fractional delay filter 120 may provide significant improvements in computational efficiency over previous methods and over a range of system scenarios. In addition to computational efficiency gains, the fractional delay filter 120 may also reduce overall power consumption relative to conventional systems.

In an alternative example, the fractional delay filter 120 may be implemented using a Gaussian Nyquist filter. An example is provided in equation 9 below.

$$h(t)=\text{sinc}(t)e^{\frac{-\pi^2t^2}{2\sigma^2}} \tag{9}$$

In equation 9, the variable σ may represent the band edge of the sinc filter. When critically sampled, the time-domain expression for the Gaussian Nyquist fractional delay filter may be determined according to equation 10 below.

$$h(i+\tau)=\text{sinc}(i+\tau)e^{\frac{-\pi^2(i+\tau)^2}{2\sigma^2}},\ \text{where}\ i\in Z \tag{10}$$

The variable i represents an integer value within a sample space Z, and the variable t represents a fractional delay. In the examples presented above with respect to equations 8 and 10 above, two realizations of a Nyquist fractional delay filter 120 are described, both of which may reduce power consumption and improve computational efficiency relative to conventional systems. While the Nyquist filters may be used, other types of filters may also be used in this fashion to produce a fractional delay filter, which may be used to provide digital beamforming for the phased array antenna 206.

Figure 3:
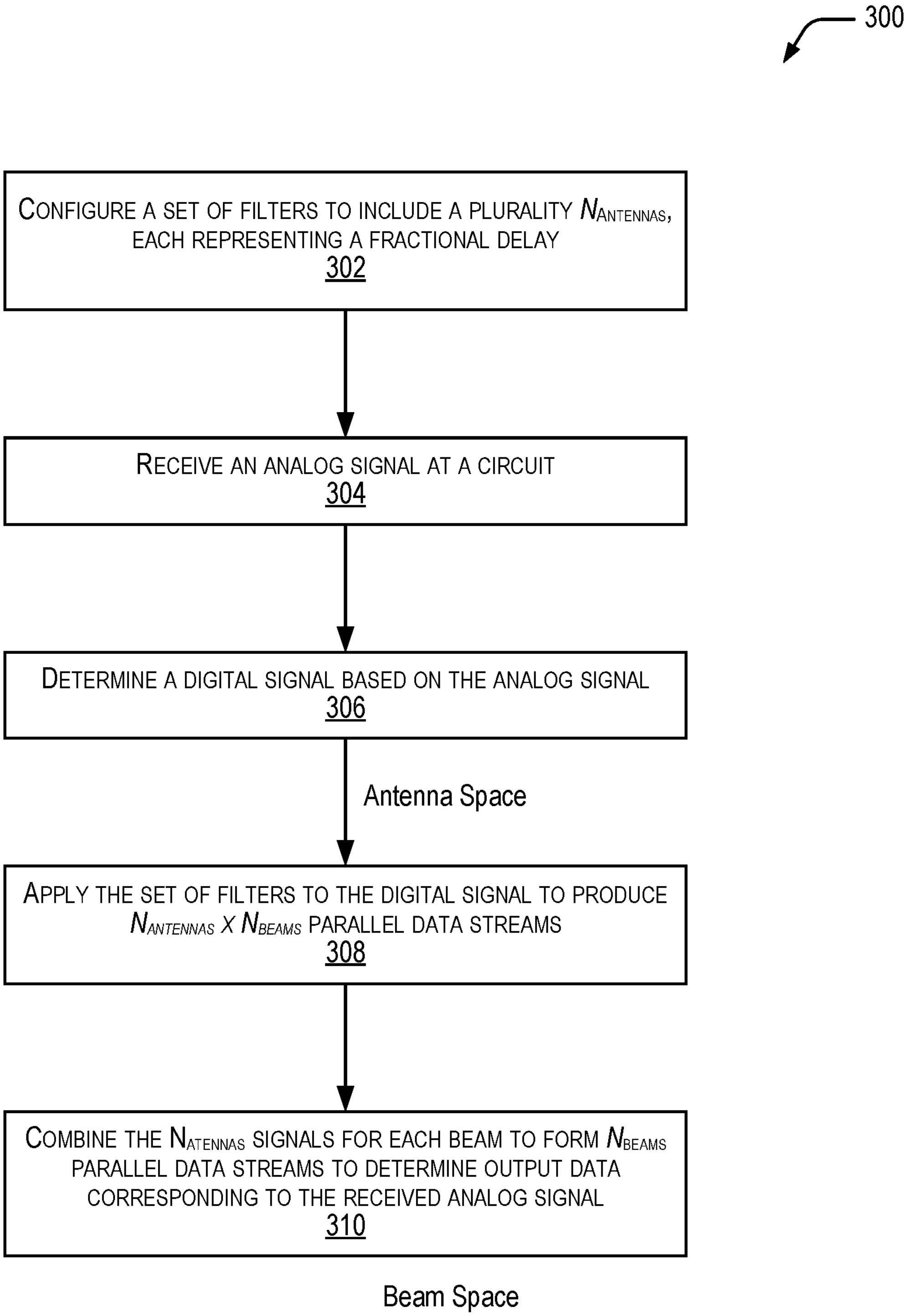
FIG. 3 depicts a flow diagram of a method of receiving a signal using fractional delay filtering, in accordance with certain embodiments of the present disclosure.

FIG. 3 depicts a flow diagram of a method 300 of receiving a signal using a fractional delay filter 120, in accordance with certain embodiments of the present disclosure. The fractional delay filter 120 of the digital beamforming circuit 118 may implement the method 300, using a processor, a field programmable gate array, an application specific integrated circuit, logic circuitry, other circuitry, or any combination thereof. In some embodiments, the system may include a memory configured to store coefficients where each discretized delay may have a unique filter stored and retrieved for use. In other embodiments, coefficients may be computed on-the-fly for each unique delay.

At 302, the method 300 may include configuring a set of filters to include a plurality of N antennas, each representing a fractional delay. As discussed above, a critically sampled generalized raised cosine filter Nyquist filter or a Gaussian Nyquist filter may be used as the fractional delay filter 120 to determine the plurality of N processing portions. The access point 102 or the user device 160 of FIG. 1 may then process received RF signals.

At 304, the method 300 may include receiving an analog signal at a circuit. The circuit may be part of the analog RF front-end 104, which may include low-noise amplifiers and other circuitry.

At 306, the method 300 may include determining a digital signal based on the analog signal. The digital signal may be determined by an ADC 112, which may be part of the digital processing circuit 212, which may include the signal processing circuitry 106 and the digital circuit 116 of FIG. 1 or which may be between the analog RF front end 104 and the digital processing circuit 212. The ADC 112 may convert the received analog signals (which may have been amplified or otherwise groomed by the analog RF front end 104) into digital signals.

At 308, the method 300 may include applying the set of filters to the digital signal to produce $N_{Antennas} \times N_{beams}$ parallel data streams. The filter may be an implementation of the fractional delay filter 120 within the digital beamforming circuit 118. In some implementations, the fractional delay filter 120 may be a critically sampled Nyquist filter, such as a generalized raised cosine Nyquist filter or a Gaussian Nyquist filter. The Nyquist fractional delay filter 120 may be in the frequency domain and could be implemented as a generalized raised-cosine Nyquist filter, a Gaussian Nyquist filter, or another Nyquist filter (other than a frequency domain rectangular filter which corresponds to a time domain sinc function) that is critically sampled and evaluated numerically or with a closed-form time-domain expression.

At 310, the method 300 may include combining the $N_{Antenna}$ signals for each beam to form the $N_{beams}$ parallel data streams to determine output data corresponding to the received analog signal. In some implementations, the digital beamforming circuit 118 may incorporate a phase shift the carrier into the filter in a way that corresponds to the time delay of the separate filters and may combine the data streams to produce the output signal according to the following expression.

$$\hat{h}(i+\tau) = h(i+\tau)e^{j2\pi f_c \tau} \tag{11}$$

It should be noted that the disclosed embodiments can be used in a variety of communication systems. Such communication systems can include, for example, single carrier OFDM (orthogonal frequency division multiplexing) systems, f-OFDM (filtered OFDM) systems, GFDM (generalized frequency division multiplexing) systems, UFMC (universal filtered multi-carrier) systems, or other types of wireless communication systems that perform beamforming operations.

Figure 4:
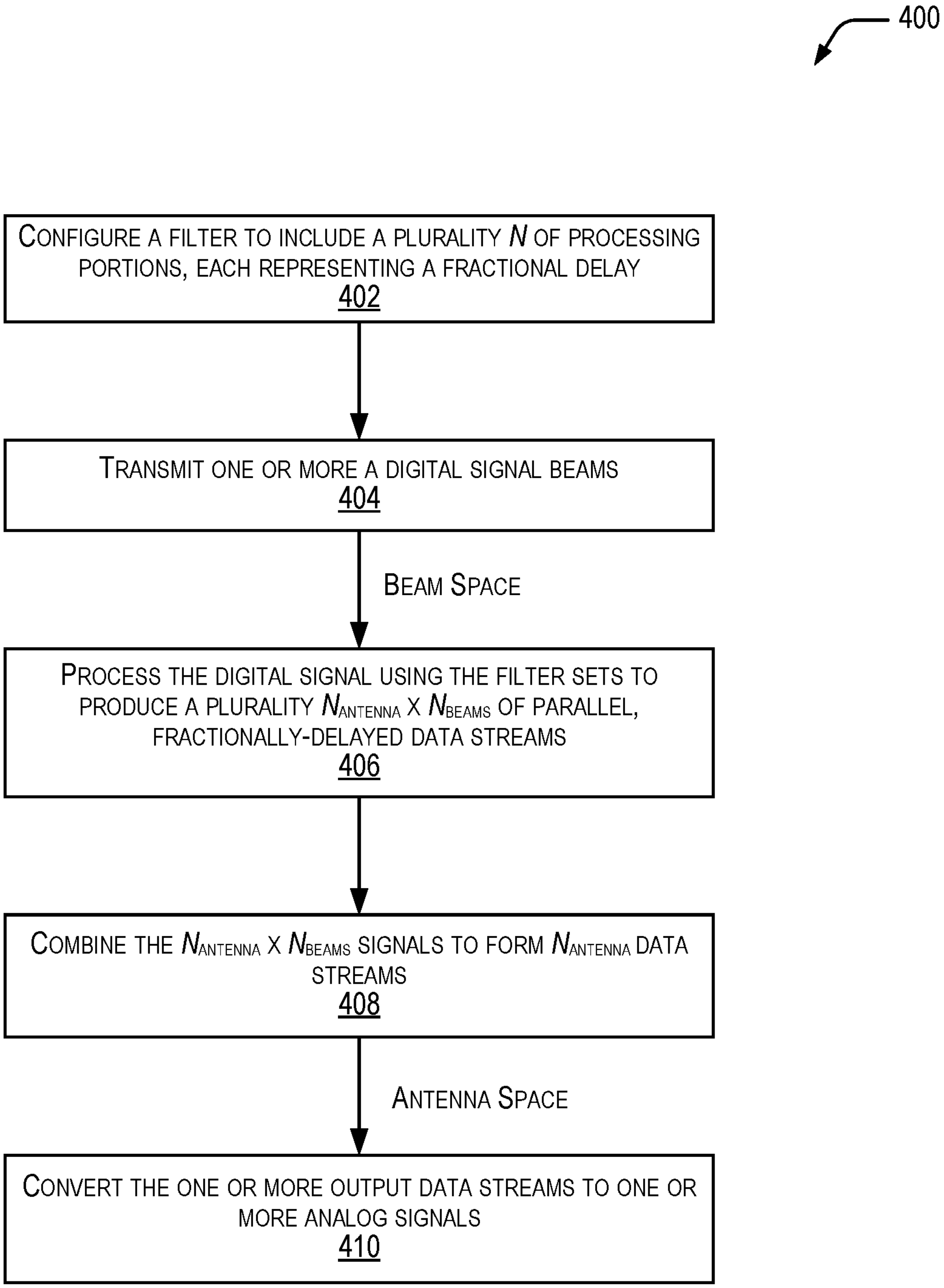
FIG. 4 depicts a flow diagram of a method of sending a signal using fractional delay filtering, in accordance with certain embodiments of the present disclosure.

FIG. 4 depicts a flow diagram of a method 400 of sending a signal using fractional delay filtering, in accordance with certain embodiments of the present disclosure. At 402, the method 400 may include configuring a set of filters to include a plurality of N processing portions where each portion represents a fractional delay and where the configuring may include retrieving coefficients from memory or dynamic computation of coefficients. The set of filters may be an implementation of the fractional delay filter 216 within the digital beamforming circuit 214. In some implementations, the fractional delay filter 216 may be a critically sampled Nyquist filter, such as a generalized raised cosine Nyquist filter or a Gaussian Nyquist filter. The Nyquist fractional delay filter 216 may be in the frequency domain and could be implemented as a generalized raised-cosine Nyquist filter, a Gaussian Nyquist filter, or another Nyquist filter other than a frequency domain rectangular filter which corresponds to a time domain sinc function that is critically sampled and evaluated numerically or with a closed-form time-domain expression.

At 404, the method 400 may include transmitting one or more digital signal beams. The digital signal beams may be received from processing circuitry, such as the digital-to-analog converter circuit 214. In some implementations, the digital signal may include data for transmission via the phased-array antenna 206.

At 406, the method 400 may include processing the digital signal using the filter sets to produce a plurality $N_{Antenna} \times N_{Beam}$ of parallel, fractionally delayed data streams. The fractional delay filter 216 may be a critically sampled Nyquist filter, such as a generalized raised cosine Nyquist filter, a Gaussian Nyquist filter, or another Nyquist filter.

At 408, the method 400 may include combining the $N_{Antenna} \times N_{Beam}$ signals to form $N_{Antenna}$ data streams. The circuit 212 may combine the data streams using the digital beamforming circuit 214.

At 410, the method 400 may include converting the one or more output data streams to one or more analog signals 410. In some implementations, the ADC/DAC 210 may convert the one or more output data streams using the DAC circuitry into one or more analog signals. The analog signals may then be provided to the analog front end 202 for transmission via the phased array antenna 206.

As discussed above with respect to FIGS. 1-4, a wireless communication system is disclosed that may include digital beamforming circuitry that is configured to utilize a critically sampled Nyquist filter as fractional delay filter. The digital beamforming circuit may include a field-programmable gate array (FPGA) circuit, an application specific integrated circuit (ASIC), a general-purpose processor, other circuitry, or any combination thereof. Additionally, the fractional delay filter may be implemented as a generalized raised cosine Nyquist filter or a Gaussian Nyquist filter. Using the critically sampled Nyquist filters as part of the digital beamforming circuitry can simultaneously improve the transmission performance and reduce the complexity of both the transmitter and receiver, independent of bandwidth restrictions.

Although the present invention has been described with reference to preferred embodiments, workers skilled in the art will recognize that changes may be made in form and detail without departing from the scope of the invention.

What is claimed is:

1. A system comprising:

an analog front-end circuit configured to receive signals from an antenna array; and a digital circuit coupled to the analog front-end circuit, the digital circuit including a digital beamforming circuit configured to include a Nyquist fractional delay filter that is piecewise continuous in a frequency domain.

2. The system of claim 1, wherein the Nyquist fractional delay filter comprises a critically sampled generalized raised cosine Nyquist filter.

3. The system of claim 2, wherein the Nyquist fractional delay filter has a frequency response represented by frequency response equation $$H_n(f) = T;\ \text{for } |f| \le \frac{1-\beta}{2T}$$

$$\text{H\_n}(f) = (T/2)\{\text{A\_0} + \text{A\_1}\cos((\pi T/\beta)(|f| - (1-\beta)/2T)) + \text{A\_3}\cos(3(\pi T/\beta)(|f| - (1-\beta)/2T)) + \ldots + \text{A\_}\{2n+1\}\cos((2n+1)(\pi T/\beta)(|f| - (1-\beta)/2T))\}$$
$$\text{for } (1-\beta)/2T < |f| \le (1+\beta)/2T$$

$$H_n(f) = 0;\ \text{for } |f| > \frac{1+\beta}{2T}$$

where T represents a symbol period, β represents a roll-off factor, An represents filter coefficients, and f represents a signal frequency.

4. The system of claim 1, wherein the Nyquist fractional delay filter comprises a Gaussian Nyquist filter.

5. The system of claim 4, wherein the Nyquist fractional delay filter has a frequency response represented by frequency response equation:

$$h(i+\tau) = \sin c(i+\tau)e\left\{-\frac{\pi^2(i+\tau)^2}{(2\sigma^2)}\right\},$$

wherein i represents an integer value within a sample space, t represents a fractional delay, and σ parameterizes a gaussian expression.

6. The system of claim 1, wherein:

the system comprises a phased array antenna system; and the fractional delay filter defines a plurality of filter coefficients, each coefficient of the plurality of filter coefficients corresponding to a fractional delay corresponding to an element of the phased array antenna system.

7. The system of claim 1, wherein the fractional delay filter includes one of a numerically computed expression or a closed-form expression for one of a time-domain response or a frequency response.

8. The system of claim 7, wherein the closed-form expression for the time- domain response is represented by time response equation:

$$h_{n(i+\tau)} = \frac{\sin(\pi(i+\tau)(1-\beta))}{(\pi i)} + \frac{\cos(\pi(i+\tau))\sin(\pi\beta(i+\tau))}{(\pi i)} + \frac{\sum_{k=0}^{k=n} A_{(2k+1)}(4\beta^2\tau\sin(\pi(i+\tau))\cos(\pi\beta(i+\tau)))}{(2k+1)^2\pi - 4\pi\beta^2(i+\tau)^2}$$

where i represents an integer value within a sample space, τ represents a fractional delay, β represents a roll-off factor, and $A_n$ represents coefficients, and k represents an index value.

9. A system comprising:

an analog front-end circuit configured to receive signals from an antenna array; and a digital circuit coupled to the analog front-end circuit, the digital circuit including a digital beamforming circuit including a fractional delay filter implemented as a Nyquist filter that is critically sampled.

10. The system of claim 9, wherein the fractional delay filter comprises a critically sampled generalized raised cosine Nyquist filter.

11. The system of claim 10, wherein the fractional delay filter has a frequency response represented by frequency response equations:

$$H_n(f) = T;\ \text{for } |f| \le \frac{1-\beta}{2T}$$

$$\text{H\_n}(f) = (T/2)\{\text{A\_0} + \text{A\_1}\cos((\pi T/\beta)(|f| - (1-\beta)/2T)) + \text{A\_3}\cos(3(\pi T/\beta)(|f| - (1-\beta)/2T)) + \ldots + \text{A\_}\{2n+1\}\cos((2n+1)(\pi T/\beta)(|f| - (1-\beta)/2T))\}$$
$$\text{for } (1-\beta)/2T < |f| \le (1+\beta)/2T$$

$$H_n(f) = 0;\ \text{for } |f| > \frac{1+\beta}{2T}$$

where T represents a symbol period, β represents a roll-off factor, $A_n$ represents filter coefficients, and f represents a signal frequency.

12. The system of claim 9, wherein the fractional delay filter includes one of a numerically computed expression or a closed-form expression for one of a time-domain response or a frequency response.

13. The system of claim 9, wherein the fractional delay filter comprises a Gaussian Nyquist filter having a frequency response represented by time response equation:

$$h(i+\tau) = \sin c(i+\tau)e\left\{-\frac{\pi^2(i+\tau)^2}{(2\sigma^2)}\right\}$$

wherein i represents an integer value within a sample space, τ represents a fractional delay, and σ parameterizes a Gaussian expression.

14. The system of claim 9, wherein the system comprises a phased array antenna system.

15. The system of claim 9, wherein the fractional delay filter includes a closed-form expression for a time-domain response that is represented by time response equation:

$$h_{n(i+\tau)} = \frac{\sin(\pi(i+\tau)(1-\beta))}{(\pi i)} + \frac{\cos(\pi(i+\tau))\sin(\pi\beta(i+\tau))}{(\pi i)} + \frac{\sum_{k=0}^{k=n} A_{(2k+1)}(4\beta^2\tau\sin(\pi(i+\tau))\cos(\pi\beta(i+\tau)))}{(2k+1)^2\pi - 4\pi\beta^2(i+\tau)^2}$$

where i represents an integer value within a sample space, τ represents a fractional delay, β represents a roll-off factor, and An represents coefficients, and k represents an index value.

16. A system comprising:

an analog front-end circuit configured to receive signals from an antenna array;

a digital circuit coupled to the analog front-end circuit, the digital circuit including a digital beamforming circuit including a fractional delay filter implemented as one of a Gaussian Nyquist filter or a generalized raised cosine Nyquist filter; and wherein the fractional delay filter is critically sampled.

17. The system of claim 16, wherein the generalized raised cosine Nyquist filter has a frequency response represented by time response equations:

$$H_n(f) = T;\ \text{for } |f| \leq \frac{1-\beta}{2T}$$

$$\text{H\_n}(f) = (T/2)\{\text{A\_0} + \text{A\_1}\cos((\pi T/\beta)(|f| - (1-\beta)/2T)) + \text{A\_3}\cos(3(\pi T/\beta)(|f| - (1-\beta)/2T)) + \ldots + \text{A\_}\{2n+1\}\cos((2n+1)(\pi T/\beta)(|f| - (1-\beta)/2T))\}$$

$$\text{for } (1-\beta)/2T < |f| \leq (1+\beta)/2T$$

$$H_n(f) = 0;\ \text{for } |f| > \frac{1+\beta}{2T}$$

where T represents a symbol period, β represents a roll-off factor, $A_n$ represents filter coefficients, and f represents a signal frequency.

18. The system of claim 16, wherein the Gaussian Nyquist filter has a frequency response represented by time response equation:

$$h(i+\tau) = \operatorname{sin}c(i+\tau)e\left\{-\frac{\pi^2(i+\tau)^2}{(2\sigma^2)}\right\}$$

wherein i represents an integer value within a sample space, τ represents a fractional delay, and σ parameterizes Gaussian expression.

19. The system of claim 16, wherein the fractional delay filter includes a closed-form expression for a time-domain response that is represented by time response equation:

$$h_{n(i+\tau)} = \frac{\sin(\pi(i+\tau)(1-\beta))}{(\pi i)} + \frac{\cos(\pi(i+\tau))\sin(\pi\beta(i+\tau))}{(\pi i)} + \frac{\sum_{k=0}^{k=n} A_{(2k+1)}\left(4\beta^2\tau\sin(\pi(i+\tau))\cos(\pi\beta(i+\tau))\right)}{(2k+1)^2\pi - 4\pi\beta^2(i+\tau)^2}$$

where i represents an integer value within a sample space, τ represents a fractional delay, β represents a roll-off factor, and $A_n$ represents coefficients, and k represents an index value.

20. The system of claim 16, wherein:

the system comprises a phased array antenna system; and the fractional delay filter defines a plurality of filter coefficients, each coefficient of the plurality of filter coefficients corresponding to a fractional delay corresponding to an element of the phased array antenna system.

* * * * *